(12) United States Patent
McConkie et al.

(10) Patent No.: US 6,828,962 B1
(45) Date of Patent: Dec. 7, 2004

(54) METHOD AND SYSTEM FOR ALTERING OBJECT VIEWS IN THREE DIMENSIONS

(75) Inventors: Alan B. McConkie, Gaston, OR (US); John L. Light, Hillsboro, OR (US); John David Miller, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,454

(22) Filed: Dec. 30, 1999

(51) Int. Cl.[7] .............................................. E06T 15/00
(52) U.S. Cl. ...................................... 345/419; 345/427
(58) Field of Search ................................. 345/419, 427, 345/619, 835, 757, 782

(56) References Cited

U.S. PATENT DOCUMENTS

| | | | | |
|---|---|---|---|---|
| 4,555,775 A | | 11/1985 | Pike ........................... | 364/900 |
| 5,555,354 A | * | 9/1996 | Strasnick et al. ........... | 345/427 |
| 5,956,028 A | * | 9/1999 | Matsui et al. ............... | 345/757 |
| 6,229,542 B1 | * | 5/2001 | Miller ......................... | 345/782 |
| 6,271,854 B1 | * | 8/2001 | Light ........................... | 345/427 |
| 6,346,940 B1 | * | 2/2002 | Fukumaga ................... | 345/427 |

OTHER PUBLICATIONS

Stuart K. Card, George G. Robertson and William York, "Xerox Palo Alto Research Center," *The Web Book and the Web Forager: An Information Workspace for the World–Wide Web*, CHI 96 Conference on Human Factors in Computing Systems, Apr. 13–18, 1996—pp. 111–117.

Stuart K. Card, George G. Robertson and William York, "Xerox Palo Alto Research Center," *The Web Book and the Web Forager: Video Use Scenarios for a World–Wide Web Information Workspace*, CHI 96, Conference on Human Factors and Computing Systems, Apr. 13–18, 1996—pp. 416–417.

S. Yadav, S. Bakshi, D. Putzolu, Raj Yavatkar, Intel Architecture Labs, Intel Corporation, *The Phoenix Framework: A Practical Architure for Programmable Networks*, "Intel Technology Journal" Q3, 1999—pp. 1–7.

* cited by examiner

*Primary Examiner*—Don Wong
*Assistant Examiner*—Hue Dung
(74) *Attorney, Agent, or Firm*—Kenyon & Kenyon

(57) ABSTRACT

A method and system are disclosed for optimally viewing a three dimensional object in a three dimensional graphical space. Each object in the three dimensional space has associated an optimal vantage point. In one embodiment, the optimal vantage point allows a position and orientation for the object or for the vantage point to be calculated, where when the object or vantage point is moved to the position and orientation where the object may be optimally viewed.

6 Claims, 11 Drawing Sheets

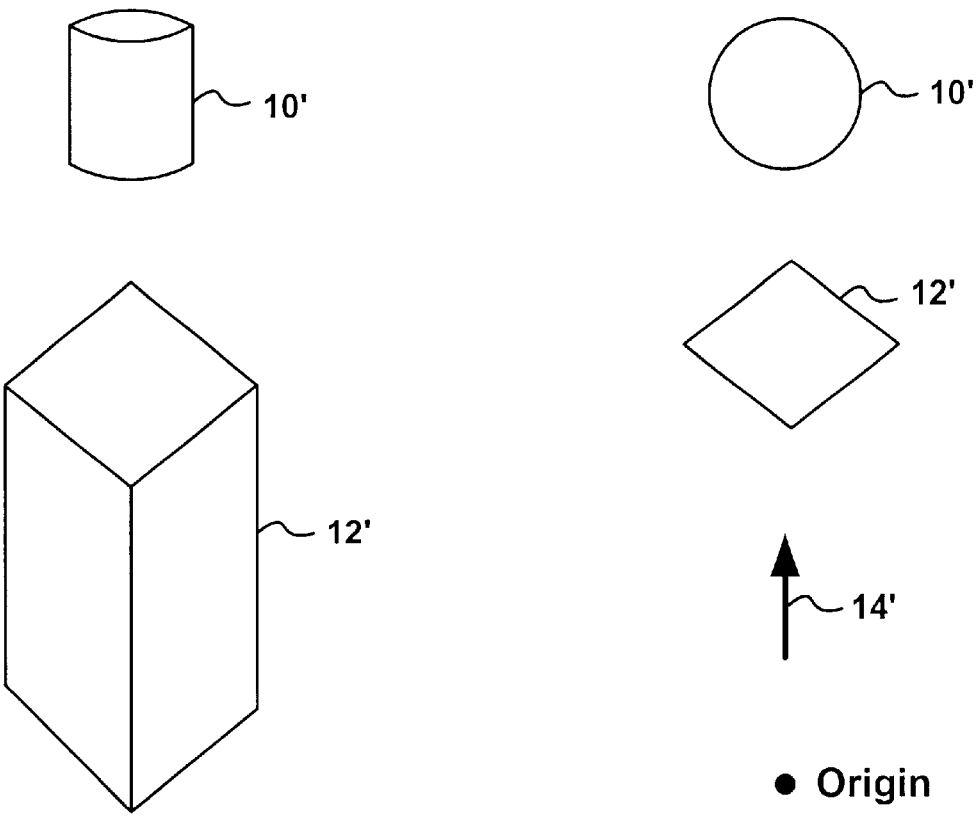
*Figure 5*       *Figure 6*

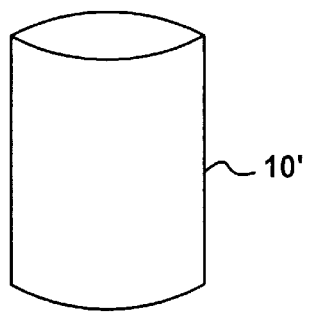
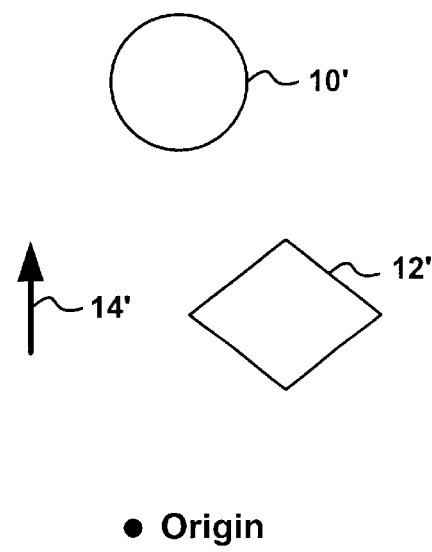
Figure 11                                    Figure 12

METHOD AND SYSTEM FOR ALTERING OBJECT VIEWS IN THREE DIMENSIONS

BACKGROUND OF THE INVENTION

I. Field of the Invention

The present invention relates generally to three dimensional graphics systems and more specifically to a system and method for viewing objects in three dimensions.

II. Background Information

Modern computer systems often provide the ability to view graphical objects in three dimensions. In three dimensional ("3D") graphical systems users view, on the two dimensional ("2D") space of a display (e.g. a monitor such as a CRT or flat screen display), a representation of 3D space. Objects in 3D space are projected onto a 2D view plane (also termed a projection plane) shown on the display. The image on the 2D view plane provides the user with a realistic view of the 3D space. The 2D projection may also be printed to hardcopy, i.e., paper.

In existing 3D graphics systems 3D objects, such as points, lines, polygons, etc., are located in a virtual 3D space. Each object in the 3D space may be defined as a collection of vectors, along with a position. The position includes x, y and z coordinates measured relative to an origin; the coordinates of the origin are (0, 0, 0). An object may have its own coordinate space: in such a case the definition of each vector is relative to the coordinate space of the object, and the position is added to the object vectors to place the object in the 3D space. An object may have a size which alters the scale of the object's vectors when the object is placed in 3D space. Each object has an orientation relative to the origin, which defines a rotation around each of the x, y and z axes. Defining objects in a 3D space, and manipulating and moving objects in a 3D space relative to an origin, are well known. Other methods of defining 3D objects may be used.

In order that a 3D object may be viewed, it is projected onto a 2D view plane which may be displayed on a monitor. Using a projection, a processor forms images on the monitor constructed from multiple pixels, which depict 3D objects as seen in the view plane. To do so a viewpoint (also termed a vantage point, reference point, or center of projection) is defined, having a position and orientation (also termed a direction of view) relative to the origin. The viewpoint position and orientation is analogous to a camera position and angle. 3D objects are projected onto the display in a manner similar to how light is projected onto camera film. Using the viewpoint, the 3D space is mapped onto the 2D view plane—a two dimensional grid comprising pixels, where each individual pixel in the 2D plane may correspond to numerous points in the 3D space. Each viewable point on each 3D object in the 3D space is mapped onto the view plane. This results in a two-dimensional image of a three-dimensional scene being represented on the display. In some cases only a portion of the view plane, the view plane window, is displayed on the monitor. 3D rendering of objects in 3D space onto a view plane window is well known in the art.

The visible portion of a 3D space is the frustum, a six sided 3D space. Referring to the figures in which like numerals indicate like elements, FIG. 1 is a diagram depicting a 3D graphics perspective projection frustum 82. Objects in 3D space 80 which are outside of the bounds of frustum 82 are not viewable. Objects closer to the viewpoint than near plane 84 or further from the viewpoint than far plane 86 are also not viewable. Objects within 3D space 80 are projected onto view plane 88; the view depicted on view plane 88 may be shown on a monitor for display to a user.

FIG. 2 is a diagram depicting a side view of a perspective projection frustum. To project objects onto view plane 88, viewpoint 90 is defined. The position and orientation of viewpoint 90 are defined relative to the origin of 3D space 80. When an object is shown in 3D space 80, the user perceives that the object resides somewhere between the near plane 84 and the far plane 86, and views the 3D space from the perspective of viewpoint 90.

According to one projection technique, a center of projection is defined and each point on an object is projected, i.e., cast or mapped, onto the view plane at the point where a line from the center of projection through the to-be-projected point intersects the view plane.

Some 3D objects in the 3D space may be obscured or otherwise difficult to view, given a certain position and orientation for the objects and viewpoint. At any one time a user can see only a portion of each 3D object viewable from the viewpoint. This is analogous to a camera or human eye, which due to its position and orientation in the world can only see a portion of viewable objects, and cannot view certain objects (e.g., distant objects) effectively. Because of "perspective foreshortening," objects appear smaller on the view plane when they are further away from the view point, and thus occupy fewer pixels on the display. Objects may be obscured by other objects or may be oriented to hide certain features a user wishes to view. A user may desire a better view of a certain object in the 3D space. Thus the user may adjust the position or orientation of the object or the viewpoint so that the object is closer to or further from the viewpoint or is oriented differently relative to the viewpoint.

Implementing these actions may be awkward for a user, as sending commands for moving a viewpoint or moving and orienting a 3D object are not as natural as similar real world actions (e.g., walking toward an object or picking up and manipulating an object). In addition, a user may desire that such operations be automatic, requiring a minimum of user action, regardless of the ease of the 3D system interface.

Systems exist allowing the viewer of a 3D space to gesture on an object and have the viewpoint moved to view the object in 3D space. However, such systems reposition the viewpoint based on the position of the object, not on any characteristics of the object which may permit the object to be properly viewed. In such current systems, after the viewpoint has been moved a user may have to readjust the orientation or position of the viewpoint or object to optimally view the object.

It is therefore desirable to have a system and method which allow for the quick and easy movement of a viewpoint or a graphical object to provide an optimal view of an object. It is further desirable to have a system and method which allow for the manipulation of an object or viewpoint to be as automatic as possible, requiring as little user action as possible. Such a system and method should provide that each object may be optimally viewed based on characteristics of that object or on a definition of an optimal view of the object.

SUMMARY OF THE INVENTION

A method and system are disclosed for optimally viewing a three dimensional object in a three dimensional graphical space. According to an embodiment of the present invention, a graphical object in the three dimensional space has associated with it a set of data indicating an optimal vantage point for the graphical object.

BRIEF DESCRIPTION OF THE DRAWINGS

FIG. 5 is a representation of a 3D space displayed by the 3D graphics module of FIG. 3 on the monitor of FIG. 3 according to an embodiment of the present invention.

FIG. 6 is a representation of a 3D space displayed by the 3D graphics module of FIG. 3 on the monitor of FIG. 3 according to an embodiment of the present invention.

FIG. 11 is a representation of a 3D space displayed by the 3D graphics module of FIG. 3 on the monitor of FIG. 3 according to an embodiment of the present invention.

FIG. 12 is a representation of a 3D space displayed by the 3D graphics module of FIG. 3 on the monitor of FIG. 3 according to an embodiment of the present invention.

DETAILED DESCRIPTION

I Overview

Figure 1:
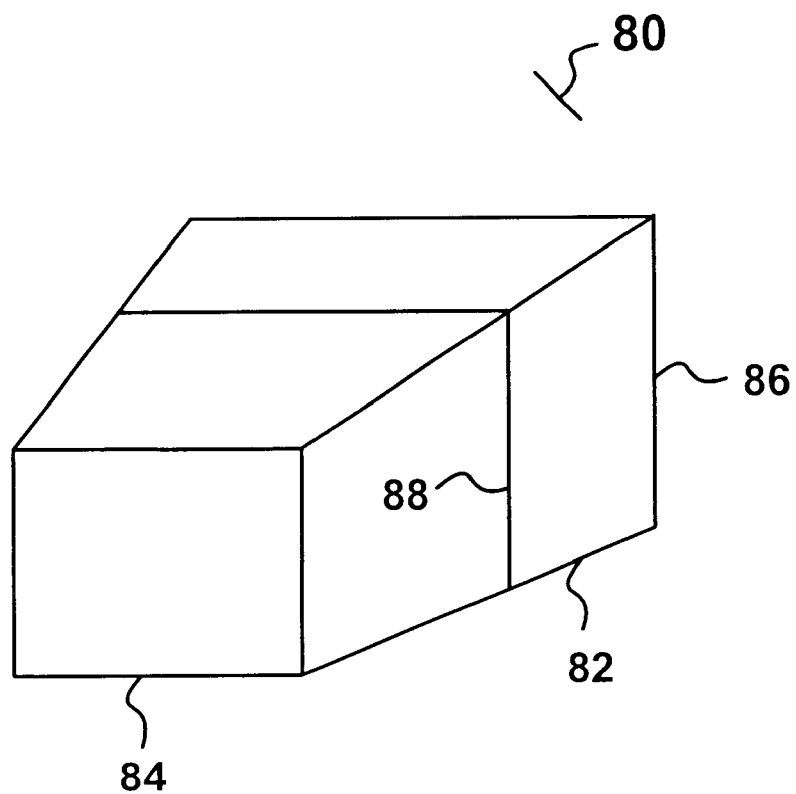
FIG. 1 is a diagram depicting a 3D graphics perspective projection frustum.
Figure 2:
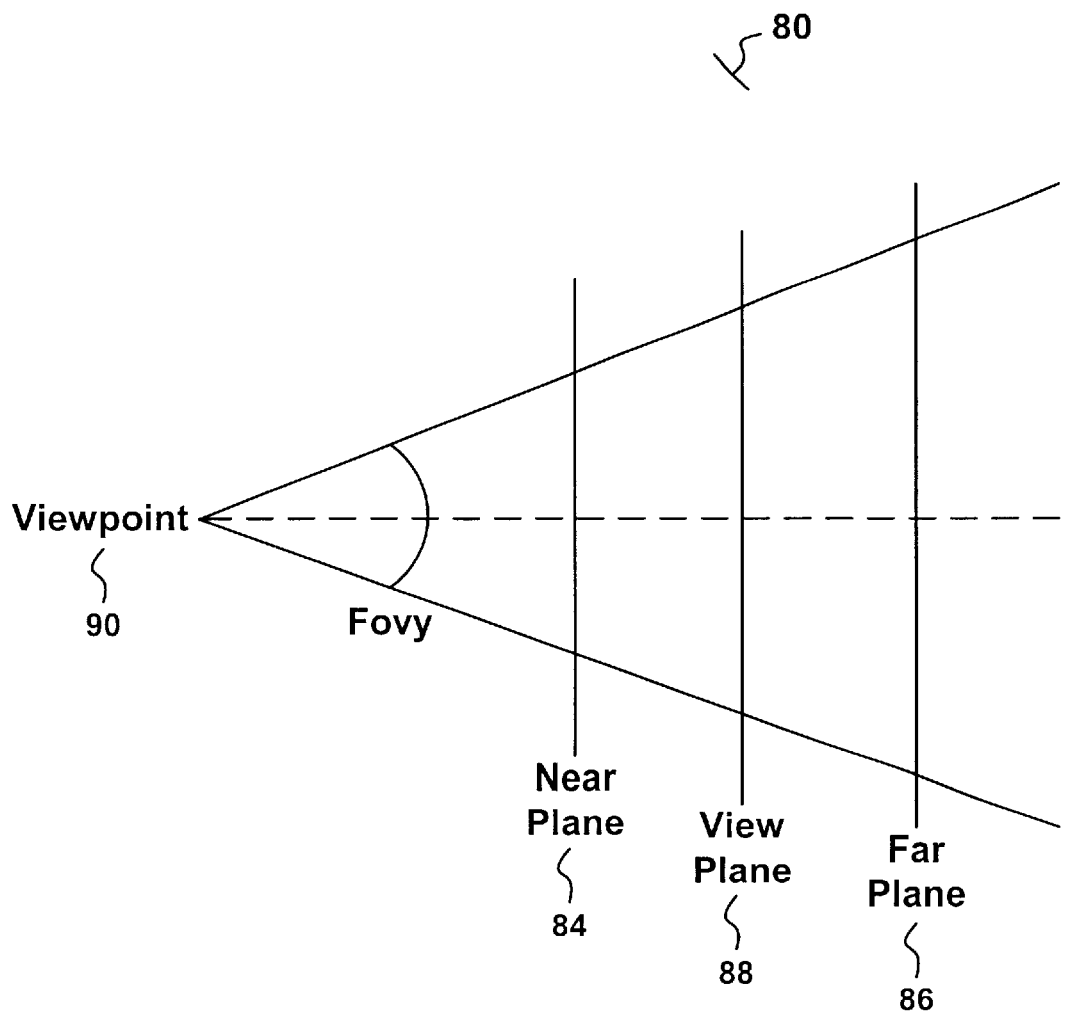
FIG. 2 is a diagram depicting a side view of a perspective projection frustum.

As further described below, embodiments of the present invention are presented to reposition the view of graphical objects in a three-dimensional scene so that they can be optimally viewed and manipulated. In a first embodiment of the present invention, each object has associated with it a set of data indicating an optimal vantage point for the object. Once an object is selected (e.g., using a cursor control device such as a mouse), the current vantage point may be modified to the optimal vantage point. Preferably, this is achieved by smoothly animating a perceived change in the vantage point (e.g., by moving the "camera") from the current one to the optimal vantage point. Alternatively, the object can be moved from its current position to a position and orientation at the optimal vantage point (again, preferably via smooth animation).

II Description of Terms

Several terms are used in the description of embodiments of the present invention. The following are descriptions of some of these terms.

Aspect Ratio—the height to width ratio of a viewable projection plane.

Fovy—field of view in the y axis.

Graphical Object—a three dimensional subject image that is viewable at a variety of distances and orientations.

Projection Plane—the viewable plane in a projection frustum.

Vantage point, viewpoint—the position and orientation of the camera; the focal point in a projection frustum.

Optimal vantage point—the position and orientation of the camera that affects the most favorable view of the object or group of objects.

III Description of Embodiments of the Present Invention

In the following description, various aspects of the present invention will be described. For purposes of explanation, specific configurations and details are set forth in order to provide a thorough understanding of the present invention. Well known features in these embodiments may be omitted or simplified in order not to obscure the present invention.

As stated above, according to an embodiment of the present invention, an object is optimally viewed based on some characteristics of the object, the vantage point or possibly other information. If a user desires, the viewpoint may be automatically moved to a viewing position which provides an optimal vantage point of the object. Alternate embodiments may allow for only the object or group of objects to be moved.

In one embodiment of the present invention, each object in a 3D space has associated with it an optimal vantage point, which provides information allowing the object to be optimally viewed. In one embodiment the optimal vantage point is a set of data allowing a primary position and orientation to be determined. The primary position and orientation are a position and orientation relationship between the object and the vantage point which allows for the object to be optimally viewed by a user/viewer. The optimal vantage point is defined in terms of a position and orientation relative to the origin. The conversion of the optimal vantage point to the primary position and orientation are affected by variable viewpoint characteristics, such as the fovy (the angle from the top of the frustum to the bottom, also called the viewing angle) and the aspect ratio (the ratio of the width of the view plane to its height). In alternate embodiments other characteristics of the 3D viewing system or objects within the 3D viewing system may affect the conversion of the optimal vantage point to the primary position and orientation.

In one embodiment, a user viewing a graphical object as a 2D projection on a display may input a command or gesture (for example, using a mouse to click on the object), indicating the user wishes a primary position to be calculated for the optimal vantage point, and that the viewpoint is to be moved in the 3D space from its current position and orientation to its primary position and orientation. Before a viewpoint is moved to a primary position and orientation, the current position and orientation of the viewpoint are saved as the secondary position and orientation. After the user finishes viewing the object, the viewpoint may be moved back to its secondary position and orientation. In alternate embodiments, a secondary position and orientation need not be stored.

If the user desires that the viewpoint be moved, the object does not move in the 3D space, but its appearance on the view plane window changes as the virtual camera represented by the viewpoint is moved. In one embodiment, if the viewpoint is to be moved, the up/down and side-to-side orientations of the viewpoint may change according to a primary position and orientation for the viewpoint, but the viewpoint may stay level with the horizon. Thus, in this example, the viewpoint may rotate around the camera's x and y axes, but not the z axis. Furthermore, the viewpoint may rotate around the x axis only between −90 and +90 degrees. Other embodiments may lessen or eliminate these limitations on viewpoint movement.

When a graphical object is viewed at an optimal orientation a certain portion of the object is displayed to the viewpoint in an ideal orientation; for example, the portion which provides most information to the viewer is displayed in an orientation which is easiest for the viewer to view the object. 3D objects viewed from a viewpoint have hidden portions—the portions on the far side of the object relative to the viewpoint. If the object is a person, the optimal orientation may have the front side of the person facing the viewpoint and perpendicular to the viewpoint. The optimal orientation may define the object's natural orientation—for example, if the object is a flower, the optimal orientation may have the stem facing down relative to the viewer.

The optimal vantage point may define a position relative to the viewer where the majority of the view plane window is taken up by the graphical object. For objects of varying size, such a position is different. For example, if an apple and an automobile are objects in a 3D space, the optimal vantage point of the apple is much closer to the viewer than the optimal vantage point of the car. This position is affected by the fovy of the viewpoint; the narrower the fovy the greater the required distance from the viewpoint to the object (to see the entire object). This position is also affected by the aspect ratio of the viewpoint; given the size and shape of an object it may be desired that it fit within the viewable area.

That the system and method of the present invention compute and store an optimal vantage point for each graphical object allows a user command or gesture to quickly alter the display so that the object is optimally viewed and so that no further user action (e.g., fine tuning the vantage point orientation) is needed. A user's command resulting in an object being better viewed is much simpler for the user than actions such as manipulating a viewpoint or object. Such actions may be awkward in current 3D systems.

In an alternative embodiment, the object itself can be moved to so that it can be optimally viewed by the user. In this embodiment, once the optimal vantage point is determined, the object is then moved in 3D space so that its position and orientation relative to the viewer's vantage point is at the optimal vantage point.

IV Operation

Figure 3:
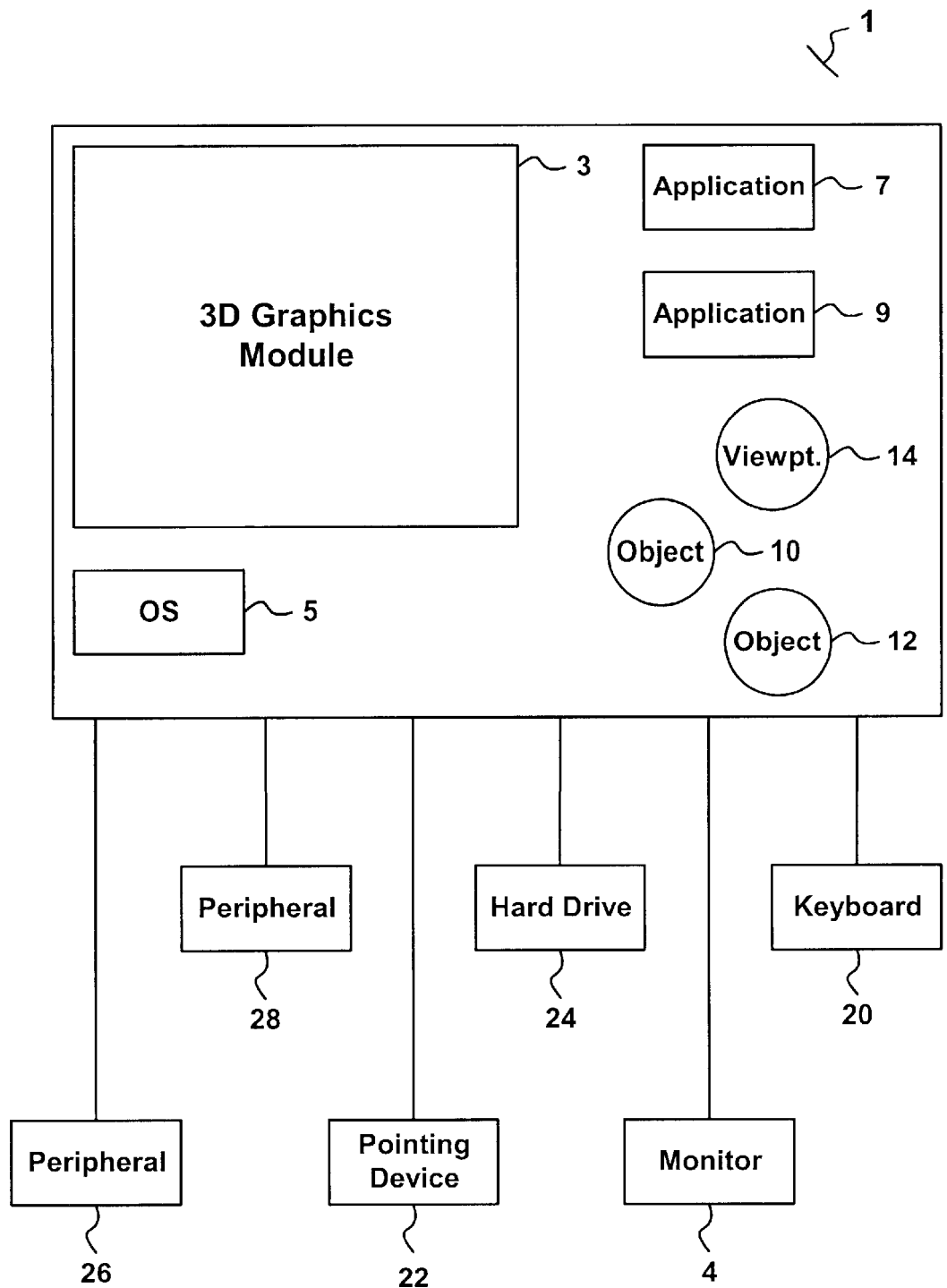
FIG. 3 is a block diagram illustrating a computer system according to an embodiment of the present invention.

FIG. 3 is a block diagram illustrating a computer system according to an embodiment of the present invention. Computer system 1 of FIG. 3 includes monitor 4, for displaying text and graphics; 3D graphics module 3, creating and manipulating a virtual 3D space which may be displayed on monitor 4; object data 10 and 12, operating in conjunction with 3D graphics module 3 to represent and display representations of the objects ("3D objects") in the 3D space; and viewpoint data 14, storing information (such as the orientation) describing the viewpoint from which the 3D space is displayed, providing functions to manipulate the view (e.g., move the virtual camera), and operating in conjunction with 3D graphics module 3 to determine how object data 10 and 12 are to be displayed. Computer system 1 includes a processor executing operating system ("OS") code 5, providing overall control of computer system 1; keyboard 20, allowing a user to input text; and a plurality of peripheral devices 22, 24, 26 and 28. Computer system 1 also stores application programs 7 and 9 which are executed by the computer system's processor to provide user functionality. Computer system 1 may be a standard personal computer or another type of data processing device, such as a workstation with advanced graphics capabilities, and in addition, may include components not traditionally found in a standard personal computer.

In this embodiment, peripheral devices 22–28 include a pointing device 22, allowing user input in conjunction with a graphical display output to monitor 4; a hard drive 24, providing storage of data and instructions; and other peripheral devices 26–28. A user uses pointing device 22 to manipulate items, such as cursors or 3D objects, which are displayed on monitor 4. Pointing device 22 may be, for example, a mouse. Various methods for allowing a user to interface with application programs using a pointing device are known and may be implemented in a number of ways.

Object data 10–12 represents a 3D graphical object and includes data and code allowing a representation of the 3D graphical object to be projected on the view plane window and displayed on monitor 4. In this embodiment, the object data 10–12 has a structure that is compatible with a general-purpose programming language such as C++. Objects are projected on the view plane window according to the location and dimensions of the projection frustum. When used herein, both a module representing a viewpoint and the displayed representation of the viewpoint itself may both be referred to by the term "viewpoint." Object data 10–12 may include master data, representing information about other graphical objects and creating an optimal vantage point. Object data 10–12 is accessed and displayed by 3D graphics module 3.

In this embodiment, object data 10–12 is in a C++ format (i.e., an object-oriented format) and includes data defining, for example, the dimensions and position of a 3D object and includes functionality through which the 3D object can be altered or manipulated. For example, object data 10–12 may include functionality allowing its associated 3D graphical object to be rotated. To rotate the 3D graphical object, an appropriate message is generated in computer system 1 to cause the visual representation of the 3D object displayed on monitor 4 to rotate. Similarly, viewpoint data 14 includes data on viewpoint characteristics and includes functionality allowing the viewpoint which is displayed on monitor 4 to be altered.

Viewpoint data 14 is displayable in that its characteristics and movement affect the view displayed in the view plane window on monitor 4. Objects are projected on the view plane window according to the location and dimensions of the viewpoint represented by viewpoint data 14. Other object data in a C++ format, such as a base object permitting calculations on or manipulations of viewable objects, may not be displayable but may affect the overall operation of the 3D space. Methods of defining, manipulating, and communicating with object data representing 3D graphical objects using messages are well known. Methods of displaying objects in a 3D space which are represented in C++ or other object-oriented code are also well known in the art. When executed, application programs 7–9 provide services to a user and may interact with 3D graphics module 3 and object data; for example a video game application may use 3D graphics module 3 and object data 10–12 to represent a playing field.

Figure 4:
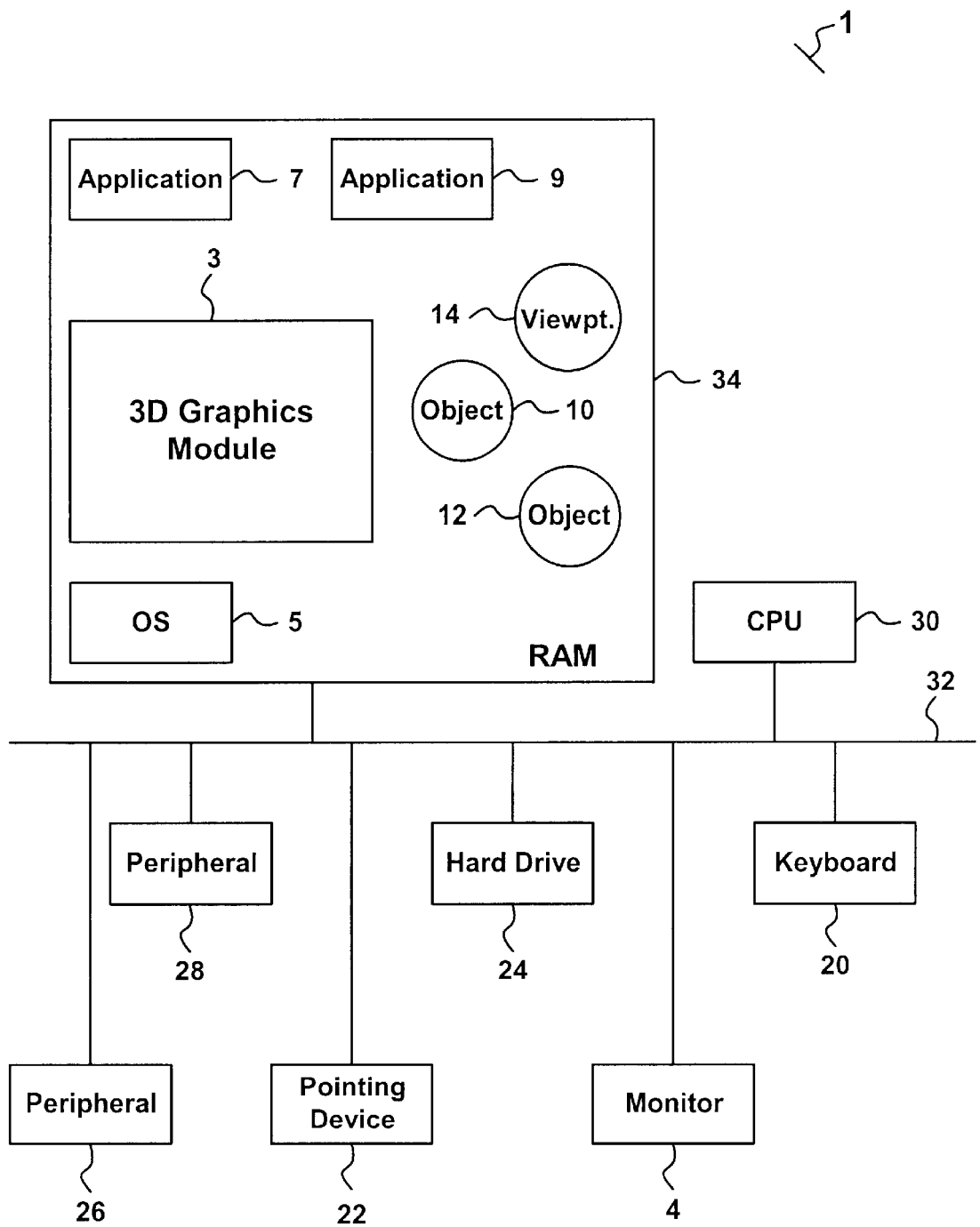
FIG. 4 is a block diagram illustrating the computer system of FIG. 3 according to an embodiment of the present invention.

FIG. 4 is a block diagram illustrating the computer system 1 of FIG. 3 according to a further embodiment of the present invention. FIGS. 3 and 4 illustrate computer system 1 from different aspects; thus like numbered components are identical in function and structure. Computer system 1 includes a processor or central processing unit ("CPU") 30, executing instructions and controlling the operation of computer system 1; random access memory ("RAM") 34, providing non-permanent storage of data and program instructions; system bus 32, connecting components of computer system 1 and allowing components of computer system 1 to communicate; a plurality of peripheral devices 22, 24, 26 and 28; monitor 4; keyboard 20; 3D graphics module 3; object data 10 and 12; viewpoint data 14; application programs 7 and 9; and OS 5. Peripheral devices 22–28 include pointing device 22, hard drive 24, and other peripheral devices 26–28.

CPU 30 may be, for example, a Pentium® processor available from Intel Corp. System bus 32 may include a plurality of busses or a combination of busses and bus bridge circuits. A portion of 3D graphics module 3, object data 10 and 12, viewpoint data 14, application programs 7–9 and OS 5 may be stored in RAM 34, on disk drive 24, or in other storage devices. Object data 10 and 12, viewpoint data 14, application programs 7–9 and OS 5 are executed by CPU 30, and to an extent control the operation of computer system 1 in cooperation with other components such as 3D graphics module 3.

3D graphics module 3, object data 10 and 12, viewpoint data 14 and application programs 7–9 may be implemented by, for example, a series of instructions stored on disk drive 24 or in RAM 34. 3D graphics module 3, object data 10 and 12 and viewpoint data 14 may be implemented in, for example, the VisualBasic® or C++ programming languages. However, the system and method of the present invention may be implemented in other languages and by other methods without affecting the overall operation or benefits of the present invention. Alternate embodiments may achieve the benefits of the system and method of the present invention without the use of the specific modules and data structures described herein. For example, modules controlling displayed objects and the viewpoint may not be in object-oriented code, and may be implemented as one module rather than separate modules.

As stated above, in one embodiment of the system and method of the present invention, each object displayable in 3D space has associated with it an optimal vantage point, a set of data allowing for the determination of a position and orientation at which the associated 3D object may be optimally viewed on monitor 4.

In one embodiment an optimal vantage point defines an optimal orientation of an object relative to a viewpoint, an optimal distance between the object and the viewpoint, and an optimal width and height relative to a view plane window. The optimal orientation includes three angles, in radians, defining a rotation of the object, one angle for each of the x, y and z axes. The optimal width and height are the dimensions, in pixels, of the object when positioned according to the orientation and when viewed straight on (i.e., the direction of view is perpendicular to the facet of the object being viewed). The optimal width and height may correspond to the width and height of a two dimensional box (i.e., a rectangular parallelogram) surrounding the object when the object is oriented according to the optimal orientation.

The optimal width and height are used in conjunction with information describing the viewpoint, including the fovy, the aspect ratio, and the near and far plane, to determine a position relative to the viewpoint at which the graphical object may be optimally viewed. The viewpoint has a variable position and orientation relative to the origin. The position of the object relative to the viewpoint, the optimal orientation and the position and orientation of the viewpoint are used to create a primary position and orientation relative to the origin for either the viewpoint or the object, and either the viewpoint or object is moved to that primary position and orientation. Prior to being moved, the current position and orientation in the 3D space of the selected object or the viewpoint may be stored as a secondary position and orientation. The secondary position and orientation may be stored as part of the object data or viewpoint data and could be used to move the object or viewpoint to its original position after the user views the object.

In an alternate embodiment the optimal vantage point of a graphical object may include information other than an orientation, width and height which allow for the object or viewpoint to be optimally positioned. For example, the optimal vantage point may describe an algorithm which may be used, in combination with object data, to compute a primary position and orientation. The optimal vantage point may include, for example, an identified area or facet on the surface of the object. The optimal vantage point may describe a position and orientation relative to the viewpoint or origin, rather than providing information enabling the calculation of such a position.

In one embodiment of the present invention, the optimal vantage point is defined by the creator of the graphical object. This may be, for example, the programmer or designer creating the object, the class defining the object or the process or module creating the object. In an alternate embodiment the optimal vantage point may be defined by another entity.

In one embodiment the optimal orientation may be defined to allow as much of the 3D object to be viewed as possible—e.g., if the object is a flower, the optimal orientation may allow for the stem and flower petals to be viewed, rather than having the flower petals hide the stem. The optimal width and height are defined based on the object being viewed at the optimal orientation—since changing the optimal orientation changes the size and shape of the image of the object, it also changes the optimal width and height. For example, if a long, thin object has an optimal orientation requiring the object to be viewed from one end rather than along its length, the actual length of the object would not affect the optimal width and optimal height; the actual width of the object would affect the optimal width and optimal height. If, per the optimal orientation, such a long, thin object is to be viewed along its length, the actual length of the object would affect the optimal width and optimal height. In one embodiment, it is assumed that the center of the viewpoint is directed towards the center of the object.

According to an embodiment of the present invention, to cause a graphical object to be optimally viewed, a user may gesture to a visible object (one which is at least partially displayed on the monitor). This gesture may be, for example, a mouse double-click on the object using a pointing device, but may be any other method of selection; for example, clicking an on-screen button, selecting an item from an on-screen menu, or via the keyboard. Per a user option, this either causes the object to be moved so the object may be optimally viewed, or causes the viewpoint to be moved so that the object may be optimally viewed. When being moved, the selected object or the viewpoint may be animated through the 3D space. In an alternate embodiment the selected object or the viewpoint is not animated, but instead the display of the 3D space is changed so that the selected object is optimally viewed. For example, the display of the 3D space may be abruptly changed to a view where the viewpoint has been moved to optimally view the selected object. In a further embodiment another method may be used to select an object to be optimally viewed, and an object not currently displayed on the monitor may be so selected.

After a user selects a graphical object to be optimally viewed (the "selected object"), the item to be moved, either the viewpoint or the selected object, is sent a message causing the item to store its current position and orientation as a secondary position and orientation; this information is stored at the item itself. In an embodiment of the present invention, objects and the viewpoint are represented using object-oriented code such as C++, and thus may store data and perform calculations on such data.

Next, the object to be optimally viewed is sent a message directing the object to compute a relative position, a position of the object relative to the viewpoint such that the object may be optimally viewed. The relative position defines a distance, in the units of the coordinate system of the 3D space, from the selected object to the viewpoint.

As an example, the relative position is created using well-known trigonometry as practiced in the art of 3D graphics programming. The selected object accesses from the viewpoint object the parameters of the viewpoint, which are globally available. The viewpoint parameters include a description of the 3D perspective (an orientation, an aspect ratio, and a fovy). Using the optimal width and height in combination with the fovy and aspect ratio, two distances are created, one each for the width and the height. Each distance defines the closest distance from the viewpoint at which the object will fit within the view plane in the relevant dimension (width or height). The greater of the two distances is used as the relative position, as the lesser distance results in the cropping of the image in one dimension (width or height). The calculation may allow for a certain border or blank space between the edges of the object and the edges of the view plane.

The selected object uses known trigonometric principles to compute the required distance. The selected object bisects the frustum to produce right triangles with respect to the Y- and the Z-axes. For example, taking the trivial case of an object centered around the line of sight, the tangent of ½ fovy=½ required_height/distance, wherein tan(theta)= opposite/adjacent. A similar calculation may be used, in combination with the aspect ratio, to calculate the distance requirements from the width. In an exemplary embodiment a relative orientation need not be defined; the orientation of the selected object with respect to the viewpoint is defined by the optimal orientation and does not need to be altered. In an alternate embodiment a relative orientation may be calculated.

The optimal vantage point may be defined so that the selected object lies between the near and far plane of the viewpoint. The near and far plane are aspects of a viewpoint describing boundaries beyond which an object will not be projected onto a view plane window. If an object (or a portion of an object) is between the near plane and the viewpoint it is too close to the viewpoint, and the object or portion is not displayed on the view plane window. If an object (or a portion of an object) is beyond the far plane, it is too far from the viewpoint to be visible on the view plane window. In either case the object or portion of the object is clipped from the view.

Next, the item to be moved (the selected object or the viewpoint) computes a primary position and orientation, defining the position and orientation, relative to the origin, of the item to be moved in the 3D space. The primary position and orientation is a position and orientation to which the item is moved so that it may be optimally viewed.

To compute the primary position and orientation, the relative position computed by the selected object (stored at the selected object), the optimal orientation of the selected object, and the viewpoint position and orientation (stored at the viewpoint) are required. Such calculations may be performed using well known 3D graphics techniques such as affine transformations. Such techniques are described in works such as "3D Computer Graphics", by Alan Watt, pp. 1–22 and 57–88, and Mathematical Elements for Computer Graphics, 2d ed., by David Rogers and J. Alan Adams, pp. 61–206. If the item to be moved is the selected object, its relative position and its primary orientation define its position and orientation relative to the viewpoint (which may be considered a virtual camera) at which it may be optimally viewed. Since the viewpoint itself has a position and orientation relative to the origin of the 3D space, the viewpoint position and orientation are considered when computing a primary position and orientation of the selected object relative to the origin. Similarly, if the item to be moved is the viewpoint, the relative position and primary orientation of the selected object may be used to define a position and orientation of the viewpoint relative to the selected object at which the selected object may be optimally viewed. The selected object has a position and orientation relative to the origin of the 3D space, which must be considered when computing a primary position and orientation of the viewpoint. If the selected object is to compute its primary position and orientation, it accesses the relevant data from the viewpoint. If the viewpoint is to compute its primary position and orientation, it accesses the relative position and optimal orientation from the selected object.

As an example, the primary position is represented as a vector having x, y, and z components, and the primary orientation is a combination of three angles relative to the origin; an x angle, a y angle and a z angle. If the item to be moved is the viewpoint, the viewpoint must remain upright to the horizon; thus the z angle remains unchanged. Alternatively, the viewpoint may be allowed to tilt with respect to the horizon. If the item to be moved is the selected object, the primary orientation for the object is calculated in light of the current orientation of the viewpoint. Thus, if the item to be moved is the selected object, the optimal orientation is used along with the orientation of the viewpoint to create a primary orientation in the 3D space. If the item to be moved is the viewpoint, the primary orientation for the viewpoint is calculated in light of the current orientation of the selected object (which is relative to the origin). Based on the teaching above, creating the optimal orientation may be done using known 3D graphics techniques.

In an alternate embodiments the calculation of the primary position and orientation may be performed in a different order than that described, and may not require the steps described. For example, the parameters of the viewpoint may be combined in one step with the optimal width, height and orientation to compute the primary position and orientation. In alternate embodiments other modules than those described may perform such calculations.

After the primary position and orientation of the item to be moved is calculated, it is passed to the 3D graphics module, which moves the item from its secondary position and orientation to its primary position and orientation. The item may be moved by being animated using methods well known in the 3D graphics programming art. If the viewpoint is animated images of all the objects on the monitor are altered to simulate the viewpoint moving through space; if the selected object is animated only the image of the selected object itself is altered on the monitor, and other objects shown on the monitor may stay the same.

For example, the animated item's position and orientation are altered in small increments over time. A timer is used to affect the animation changes at a rate of approximately 10–30 frames per second. At each frame, the current time is examined to determine the percentage of time that has elapsed between the start of the animation and the end of animation. If the item to be animated is a graphical object, this percentage is used to interpolate, either linearly or according to some non-linear function (e.g., slow-in/slow-out, where the movement of the object is accelerated smoothly from a standing start and decelerated smoothly to a stop), the current position and orientation of the object. At each frame, the object and all objects in the 3D space are projected onto the view plane window and displayed on the monitor. The position of the object is altered at each frame. If other displayed objects are not animated, they may remain in their positions. As the object is moved through space other objects may have to be avoided, altering the path of the selected object. Techniques of animating objects in this manner are known in the art.

If the item to be animated is the viewpoint, the display of all objects on the screen are altered as the viewpoint changes over time. Thus, it may be considered that to animate the viewpoint, the objects in the 3D space (rather than the viewpoint) are actually animated. The computed percentage of time is used to interpolate the instantaneous position and orientation of the viewpoint, either linearly or according to some non-linear function. At each frame the objects in the 3D space are projected onto the view plane window and displayed on the monitor. The position of all objects relative to the viewpoint, but not relative to the origin, is altered at each frame. As the viewpoint is animated through space other objects may have to be avoided. Techniques for animating a viewpoint and thereby altering the display of viewable objects in this manner are known in the art.

By moving the object or viewpoint to a position and orientation which are tailored to the particular object, the system and method of the present invention allow a user to quickly and easily view the object in an optimal manner. Through the primary orientation, a certain facet providing the best view of the object may be displayed. Since the primary position and orientation are tailored to the individual object itself, not only to the position of the object in the 3D space, the user is not required to manipulate the object or viewpoint after an initial move. However, after the viewpoint or selected object is moved to the primary position and orientation the user may use standard techniques to manipulate the viewpoint or selected object to better view the selected object.

The item to be moved may be moved back to its original position. A user may gesture on the selected object or indicate via the keyboard or other method that the item to be moved should be moved back. The 3D graphics module queries the item (the graphical object or viewpoint) for the stored secondary position and moves the item back to its original position, in a manner similar to the manner in which the item is animated to its primary position and orientation, discussed above.

In certain embodiments of the system and method of the present invention, the optimal vantage point is created at the time the optimal vantage point is needed, rather than when the graphical object is created.

In one such embodiment, execution of a master program module (e.g., an object-oriented programming language module associated with the 3D graphics module) determines the optimal vantage point using externally computable information about the graphical object, such as the dimensions of the graphical object. In order to obtain the dimensions of the graphical object for which a vantage point is to be created, the master program module may query the object. To do so, the master program module first determines the optimal orientation, then determines the optimal width and height. To determine an orientation of the graphical object relative to the viewpoint the master program module determines which orientation exposes the greatest portion of the graphical object to the viewpoint. For example, if the graphical object is a flower, the optimal orientation may allow viewing of the length of the stem including the petals, rather than a top-down view where the petals may hide the stem. Also, the user may preselect which of these orientations is the optimal orientation. After determining the optimal orientation, the master program module determines the optimal width and height for this object at the optimal orientation. Using standard trigonometric functions, the master program module determines the width and height, in pixels, of a 3D extent box surrounding the graphical object when the graphical object is oriented according to the optimal orientation. In an alternate embodiment the master program module may perform such a calculation using other methods or sequences of steps, or may perform additional functions. In further embodiments, the 3D graphics module may perform such functions, or the graphical object itself may calculate its own optimal vantage point. Other embodiments using different formats for an optimal vantage point may compute this data in a different manner.

1. Group of Objects

In one embodiment of the system and method of the present invention, groups of graphical objects may have an associated optimal vantage point, defining an orientation, width and height of the group of objects relative to a viewpoint and view plane window. The optimal vantage point defines a vantage point for the graphical objects when viewed as one unit. The optimal width and height is similar to that for individual objects, and defines a width and height of the group of objects. The optimal orientation is similar to that for individual graphical objects, and includes three angles.

Figure 13A:
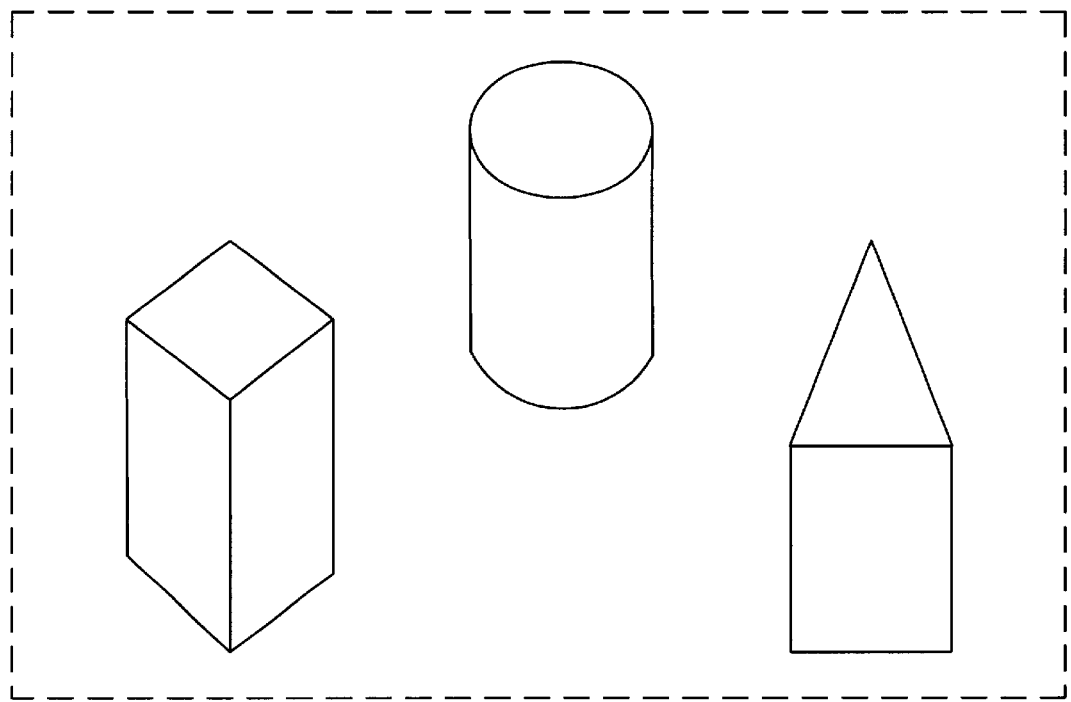
FIGS. 13a–c are representations of a 3D space including a group of objects displayed by the 3D graphics module of FIG. 3 on the monitor of FIG. 3 according to an embodiment of the present invention.

The optimal vantage point associated with a group of graphical objects may be created by a master program module, the 3D graphics module, or by a data object (e.g., in an object-oriented programming language) representing the group of graphical objects. The optimal vantage point may be calculated by first determining an optimal orientation at which the greatest portion of the overall surface area of the objects may be viewed. To determine the optimal width and height, a figurative box (see FIG. 13a) is considered around the group of graphical objects, the box being oriented according to the optimal orientation, and being the smallest box which may fully encompass a view which includes all objects in the group at this orientation. The dimensions of this box are the optimal width and height. Alternately, the box may be drawn first, as the smallest box which may encompass the graphical objects at any orientation; the resulting necessary orientation of the graphical objects becomes the optimal orientation.

Since graphical objects nearer to the viewpoint may interfere with or block the view of graphical objects directly behind them, relative to the viewpoint, the optimal orientation of the group may be such that each graphical object minimally blocks the view of other graphical objects in the group. Since the optimal vantage point is meant to allow all the objects in the group to fit in the view plane window, not every object in the group may be viewed at its individual optimal vantage point. In alternate embodiments, the optimal width and height may be defined using a different shape, or without the use of a shape. In further embodiments, other methods of creating optimal vantage points for groups of objects may be used.

As with individual graphical objects, the optimal width and height of the group of graphical objects are used in conjunction with viewpoint characteristics to determine a position relative to the viewpoint at which the group of objects may be optimally viewed. The position relative to the viewpoint is used with other information to create a primary position and orientation relative to the origin for either the viewpoint or the group of objects, and either the viewpoint or the group of graphical objects is moved to that position and orientation.

A user may gesture to a group of graphical objects which have been selected using a pointing device; methods of selecting a group of objects in 3D space are known in the art. In one embodiment, this causes the group of objects to be moved to a position computed using an optimal vantage point; in another embodiment, this causes the viewpoint to be moved to a position computed using an optimal vantage point. The group of objects may be represented by a data object (e.g., using an object-oriented programming language) associated with the 3D graphics module, or information on the group of objects (such as the membership of the group, the primary and secondary position and orientation) may be stored in the 3D graphics module.

When a group of objects has been selected as a group, or is to be moved to a primary position and orientation, the current position and orientation of the group in the 3D space is stored as a secondary position and orientation, either at the data object representing the group or in the 3D graphics module.

Figure 13B:
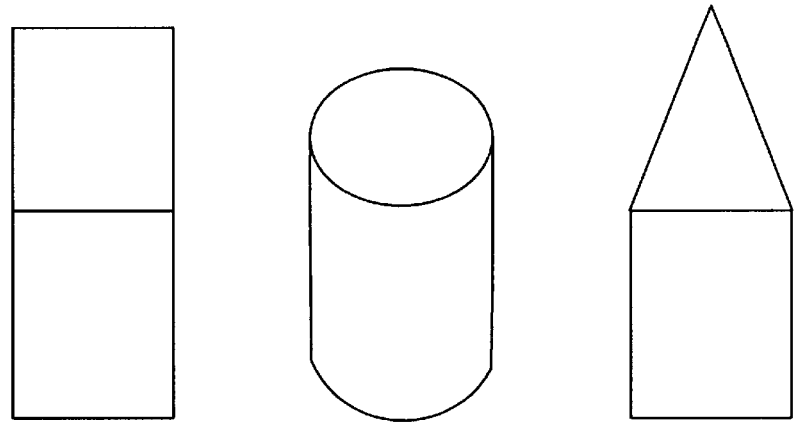
Figure 13C:
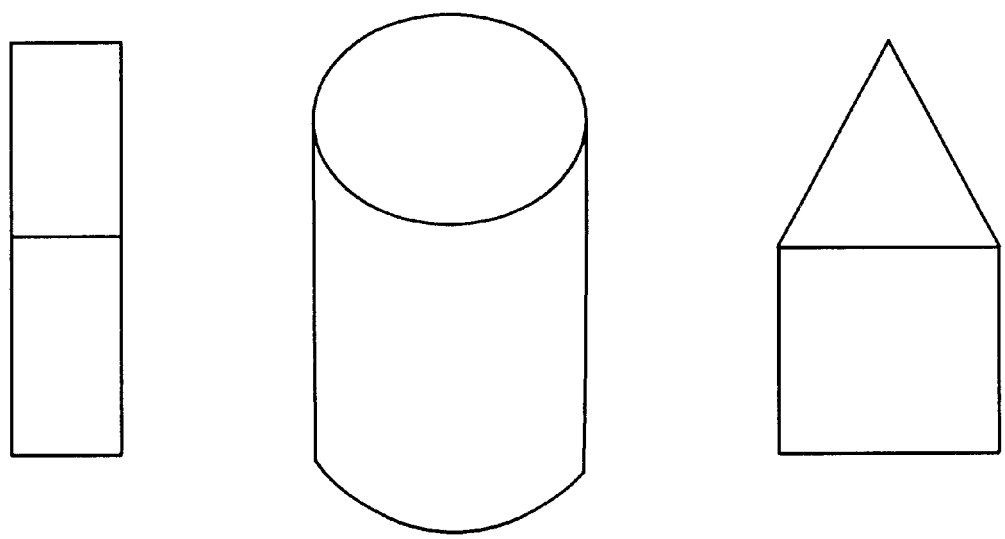

On receiving a message indicating the group of graphical objects should be viewed at its primary position and orientation, a relative position is computed. A primary position and orientation for the group of objects or the viewpoint are then calculated. These computations are similar to those performed for individual objects, and may be performed in part by a data object representing the group of objects (in an object-oriented programming language) or by the 3D graphics module. The 3D graphics module animates the group of objects or the viewpoint from its secondary position and orientation to its primary position and orientation using, for example, methods well known in the 3D graphics programming art. When being animated to the primary position and orientation, the group of objects may be moved so that the objects maintain their positions and orientation relative to one another. Thus, as the distance between the objects comprising the group becomes larger the less effective the optimal vantage point is at allowing the objects to be optimally displayed. In one embodiment the position and orientation of the 3D objects in the group relative to each other remains fixed as the group or viewpoint is animated. In alternate embodiments, the positions and orientations may be altered to enhance viewability; for example, the distance between objects may be reduced, and objects may be repositioned and reoriented relative to each other so that their individual optimal orientations are used (see FIG. 13b). For example, in the case of bringing the group of objects to the camera, the area of the view plane window may be divided among the objects to optimally fill the space. The actual area alotted to each object may be equal (as in FIG. 13b) or unequal (as in FIG. 13c), either automatically prioritized by attributes of the object such as relative size or importance, or via user input. The group of objects or the viewpoint may be moved back to its original position and orientation after a user gesture.

FIG. 5 is a representation of a 3D space displayed by 3D graphics module 3 on monitor 4 (FIG. 3) according to an embodiment of the present invention. 3D graphics module 3 uses object data 10 and 12 (FIG. 3) to represent a cylinder 10' and a cube 12', respectively, which are displayed on monitor 4 according to the position, orientation and characteristics of viewpoint data 14 (FIG. 3). Object data 10 and 12, cylinder 10', cube 12' and viewpoint data 14 each have an absolute position and orientation relative to the origin (not shown) of the 3D space. Cube 12' is in the foreground relative to cylinder 10' and is closer to the virtual camera represented by viewpoint data 14 than cylinder 10'. FIG. 6 is a representation of a 3D space displayed by 3D graphics module 3 on monitor 4 (FIG. 3) according to an embodiment of the present invention. FIG. 6 depicts the 3D space from above, in two dimensions. Viewpoint representation 14' represents the viewpoint from which cylinder 10' and cube 12' are viewed. Viewpoint representation 14', cylinder 10' and cube 12' each have an absolute position and orientation relative to the origin of the 3D space.

Figure 7:
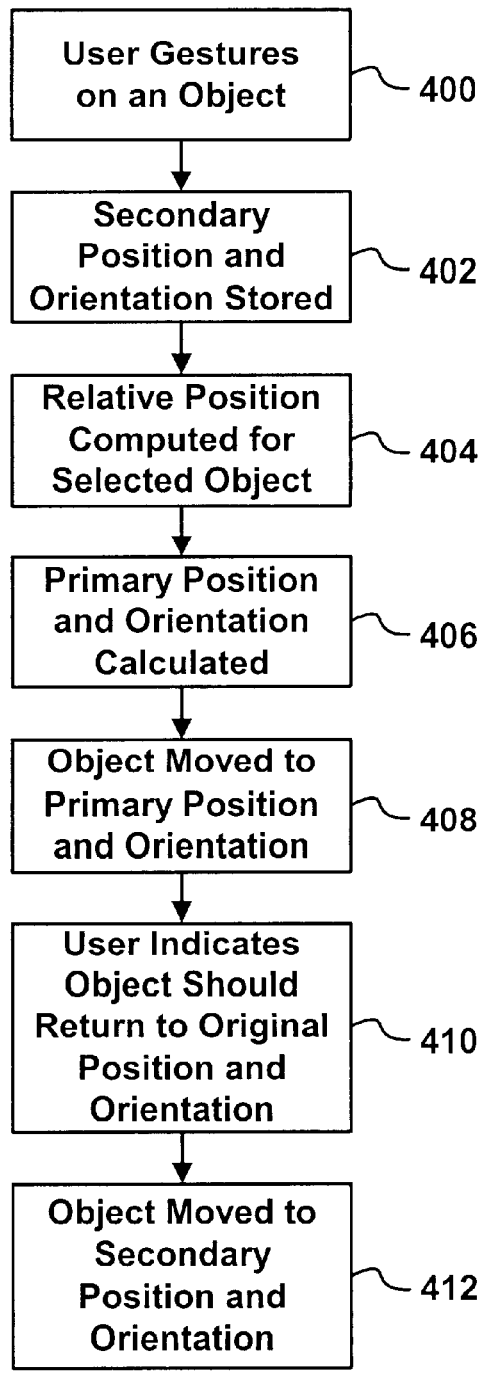
FIG. 7 is a flow chart illustrating the operation of the computer system of FIG. 3 according to an embodiment of the present invention, when a user option is set so that an object is moved in response to a gesture.

If a user has so indicated, a user gesture results in an graphical object being moved so that it may be optimally viewed. FIG. 7 is a flow chart illustrating the operation of computer system 1 of FIG. 3 according to an embodiment of the present invention, when a user option is set so that an object is moved in response to a gesture.

Referring to FIGS. 3, 6 and 7, in step 400 a user gestures on a graphical object. For example, the user gestures on cylinder 10' which is represented by object data 10. The user has indicated that such a gesture is to cause the selected graphical object to be moved so that it is optimally viewed.

In step 402 the current position and orientation for the selected graphical object in the 3D space are recorded as a secondary position and orientation. For example, object data 10 stores its current position and orientation.

In step 404 a relative position is computed for the selected object. For example, object data 10 uses a procedure to compute its optimal position relative to viewpoint data 14. To do so, object data 10 may be required to access parameters of viewpoint data 14.

In step 406 a primary position and orientation are calculated for the graphical object. For example, object data 10 uses a procedure to compute a primary position and orientation using the relative position computed in step 404, its primary orientation, and the position and orientation of viewpoint data 14. Object data 10 accesses viewpoint data from viewpoint data 14. The primary position and orientation is a position and orientation in the 3D space relative to the origin.

Figures 8, 9:
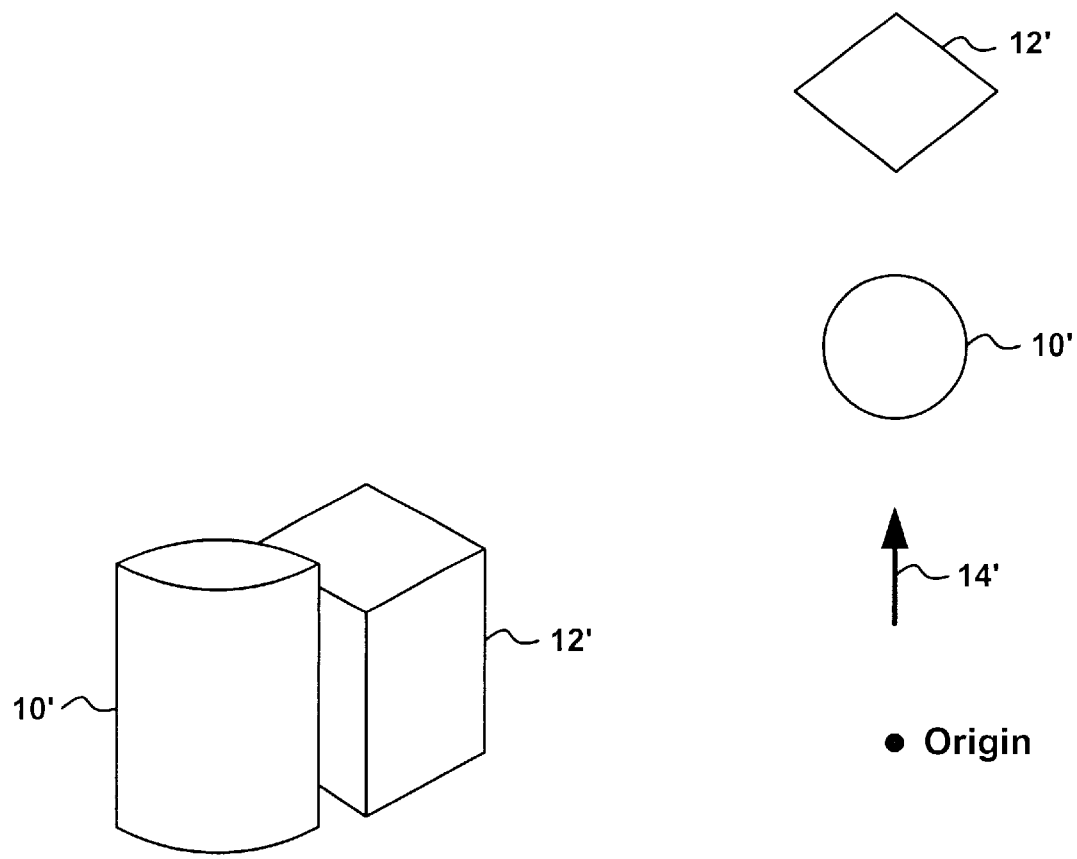
FIG. 8 is a representation of a 3D space displayed by the 3D graphics module of FIG. 3 on the monitor of FIG. 3 according to an embodiment of the present invention.
FIG. 9 is a representation of a 3D space displayed by the 3D graphics module of FIG. 3 on the monitor of FIG. 3 according to an embodiment of the present invention.

In step 408 the graphical object is moved to the primary position and orientation. Other graphical objects in the 3D space are not moved, and the orientation or characteristics of the viewpoint are not altered. The user may view the graphical object, and may use standard techniques to manipulate or move the object or move the viewpoint. For example, object data 10 passes to 3D graphics module 3 (FIG. 3) its primary position and orientation, and 3D graphics module 3 moves object data 10 (and thus cylinder 10') to its primary position and orientation. FIG. 8 is a representation of a 3D space displayed by 3D graphics module 3 on monitor 4 (FIG. 3) according to an embodiment of the present invention. FIG. 8 depicts such a representation after cylinder 10' is moved to be viewed according to its optimal position and orientation. Cylinder 10' has been moved relative to the origin to be optimally viewed by viewpoint representation 14'; cube 12' is now partially obscured by cylinder 10', and the image of cylinder 10' is larger and thus more easily viewed. FIG. 9 is a representation of a 3D space displayed by 3D graphics module 3 on monitor 4 (FIG. 3)

according to an embodiment of the present invention. FIG. 9 depicts such a representation after cylinder 10' is moved to be viewed according to its optimal position and orientation. FIG. 9 depicts the 3D space from above, in two dimensions. Cylinder 10' has been moved to be optimally viewed; viewpoint representation 14' remains still relative to the origin. In alternate embodiments, other methods may be used to animate the graphical object to its primary position and orientation. For example, surrounding objects may be animated to enhance the depiction of movement or to allow for better viewing of the object.

In step 410 the user indicates the graphical object should be moved back to its original position and orientation, stored as its secondary position and orientation. The user may input a command or gesture. It is not necessary that the object be moved back to its original position.

In step 412 the graphical object is moved to the secondary position and orientation. For example, 3D graphics module 3 is passed the secondary position and orientation of object data 10 and modifies this data so as to animate cylinder 10' to its secondary position and orientation.

Figure 10:
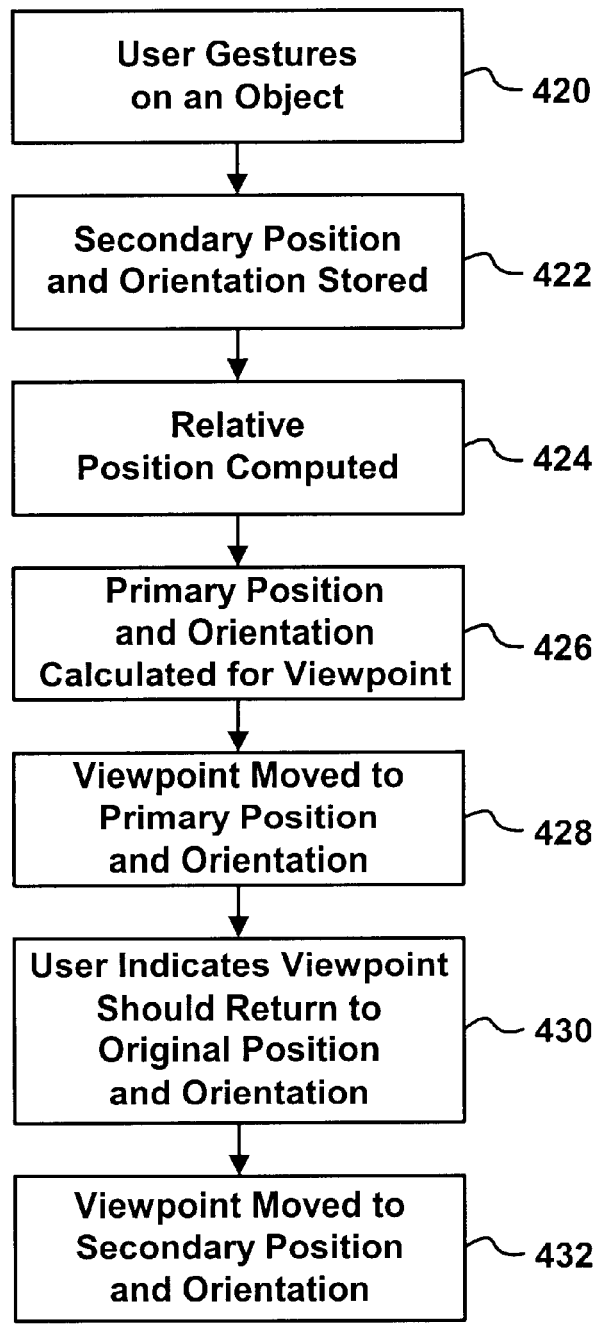
FIG. 10 is a flow chart illustrating the operation of the computer system of FIG. 3 according to an embodiment of the present invention, when a user option is set so that the viewpoint is moved in response to a gesture.

If a user has so indicated, a user gesture results in the viewpoint being moved so that an object may be optimally viewed. FIG. 10 is a flow chart illustrating the operation of computer system 1 of FIG. 3 according to an embodiment of the present invention, when a user option is set so that the viewpoint is moved in response to a gesture.

Referring to FIGS. 3, 7 and 10, in step 420 a user gestures on a graphical object. The user has indicated that such a gesture is to cause the viewpoint to be moved so that the selected object is optimally viewed. For example, the user gestures on cylinder 10' which is represented by object data 10.

In step 422 the current position and orientation of the viewpoint object are saved as a secondary position and orientation; viewpoint object 14 stores this information as a variable or member.

In step 424 the relative position is computed for the selected graphical object. For example, if the user has gestured on a graphical object represented by object data 10, object data 10 may use a procedure to compute its optimal position relative to viewpoint data 14. Object data 10 may access parameters of viewpoint data 14.

In step 426 a primary position and orientation are computed for the viewpoint. For example, if the graphical object represented by object data 10 has been selected, viewpoint data 14 uses a procedure to compute a primary position and orientation, using data possibly obtained from object data 10 (its relative position, computed in step 424, its primary orientation and its position and orientation relative to the origin). The primary position and orientation defines a position and orientation relative to the origin for viewpoint data 14, from which object data 10 may be optimally viewed.

In step 428 the viewpoint is moved to the primary position and orientation. As the viewpoint is moved, the representation of the view displayed is animated so that it appears as if the viewpoint representation is moving through the 3D space, as if a camera were moving through a physical space. The graphical objects in the 3D space do not move relative to the origin, but depictions of the objects are moved on the display. For example, the user may have indicated that viewpoint representation 14' should be moved from its position and orientation as depicted in FIG. 6 to a position where cylinder 10' is viewed according to its optimal position and orientation, resulting in the view depicted in FIGS. 11 and 12. FIG. 11 is a representation of a 3D space displayed by 3D graphics module 3 of FIG. 3 on monitor 4 of FIG. 3 according to an embodiment of the present invention. FIG. 11 depicts such a representation after viewpoint data 14 has its position and orientation altered so that cylinder 10' may be viewed according to its optimal position and orientation. The position and orientation of the viewpoint has been moved relative to the origin so that viewpoint data 14 may represent an optimal view of cylinder 10'. Since this required the position of the viewpoint is to be moved closer to cylinder 10', the position of viewpoint has moved past cube 12', and cube 12' is now not viewable from the vantage point of the viewpoint. FIG. 12 is a representation of a 3D space displayed by 3D graphics module 3 on monitor 4 (FIG. 3) according to an embodiment of the present invention. FIG. 12 depicts such a representation after the position and orientation of the viewpoint is moved so cylinder 10' may be viewed according to its optimal position and orientation. FIG. 12 depicts the 3D space from above, in two dimensions. Viewpoint representation 14' has been moved relative to the origin; cylinder 10' remains still relative to the origin. In alternate embodiments, other methods may be used to animate the viewpoint.

In step 430 the user indicates the viewpoint is to be moved to its original position and orientation, the secondary position and orientation.

In step 432 the viewpoint is moved to the secondary position and orientation. 3D graphics module 3 is passed the secondary position and orientation of viewpoint data 14 and moves viewpoint data 14 to the secondary position and orientation.

In an alternate embodiment, some combination of moving the viewpoint and moving the graphical object may be used; for example, it may be aesthetically appealing to have the object and the viewpoint meet each other "half way"; or the viewpoint may view the object in a designated area.

V Conclusion

Several embodiments of the present invention are specifically illustrated and/or described herein. However, it will be appreciated that modifications and variations of the present invention are covered by the above teachings and are within the purview of the appended claims without departing from the spirit and intended scope of the invention.

What is claimed is:

1. A method for optimally viewing a three dimensional object in a set of objects in a three dimensional graphical space, the method comprising:

associating with each object in the set of objects an optimal vantage point for the object;

receiving a signal indicating a gesture from a user, the gesture associated with a selected object;

moving the selected object from a first position and orientation to a position and orientation calculated using the optimal vantage point for the selected object;

wherein the set of objects includes a group of graphical objects and set of data indicates an optimal vantage point for the group of graphical objects;

receiving a signal associated with selecting said group of graphical objects;

altering the display of the group of graphical objects in the three dimensional graphical space so that the group of graphical objects is viewable according to the optimal vantage point associated with the group of graphical objects; and wherein each of said graphical objects maintain an orientation and spacing relative to each other during said altering operation.

2. The method of claim 1 wherein said altering operation includes modifying at least one of an orientation and spacing of at least one of said graphical objects.

3. The method of claim 1 where each optimal vantage point indicates the size of the associated object.

4. The method of claim 1 where each optimal vantage point indicates an orientation for the associated object.

5. The method of claim 1 where moving the selected object includes at least rendering the selected object at a plurality of locations within the three dimensional space.

6. The method of claim 5, wherein each object comprises a three dimensional geometric model.

* * * * *